(12) United States Patent
Ahmed et al.

(10) Patent No.: US 11,976,005 B2
(45) Date of Patent: May 7, 2024

(54) METHODS OF MAKING COATED GLASS-BASED PARTS

(71) Applicant: CORNING INCORPORATED, Corning, NY (US)

(72) Inventors: Izhar Zahoor Ahmed, Saratoga, CA (US); Jason Thomas Harris, Horseheads, NY (US); Guangli Hu, Berkeley Heights, NJ (US); Sam Samer Zoubi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 419 days.

(21) Appl. No.: 16/767,911

(22) PCT Filed: Nov. 29, 2018

(86) PCT No.: PCT/US2018/063032
§ 371 (c)(1),
(2) Date: May 28, 2020

(87) PCT Pub. No.: WO2019/108774
PCT Pub. Date: Jun. 6, 2019

(65) Prior Publication Data
US 2020/0399171 A1  Dec. 24, 2020

Related U.S. Application Data

(60) Provisional application No. 62/592,066, filed on Nov. 29, 2017.

(51) Int. Cl.
*C03C 3/091* (2006.01)
*C03B 23/035* (2006.01)
(Continued)

(52) U.S. Cl.
CPC .......... *C03C 3/091* (2013.01); *C03B 23/0357* (2013.01); *C03C 3/083* (2013.01);
(Continued)

(58) Field of Classification Search
None
See application file for complete search history.

(56) References Cited

U.S. PATENT DOCUMENTS 4,059,428 A   11/1977 Andrews
5,192,353 A   3/1993 Trentelman
(Continued)

FOREIGN PATENT DOCUMENTS

CN   202784250 U   3/2013
CN   104768890 A   7/2015
(Continued)

OTHER PUBLICATIONS

Chinese Patent Application No. 201880077084.5, Office Action dated Feb. 16, 2022, 20 pages (11 pages of English Translation and 9 pages of Original copy), Chinese Patent Office.
(Continued)

*Primary Examiner* — Lisa L Herring
(74) *Attorney, Agent, or Firm* — William J. Tucker

(57) ABSTRACT

Making a glass-based article having a coating and a target shape which comprises a planar central portion and a perimeter portion which borders at least part of the planar central portion and extends out of the plane of the planar central portion, the perimeter portion having a perimeter edge and a target edge-to-opposite edge dimension. The method includes forming a glass-based part to provide an initial formed part having an initial three-dimensional shape that is different from the target shape for at least the target edge-to-opposite edge dimension. Applying a coating to the initial formed part to form the glass-based article having a
(Continued)

coating, the coating imparting a stress to the initial molded part that causes a calculated, warp-induced change to the initial shape.

11 Claims, 10 Drawing Sheets

(51) Int. Cl.
| | |
|---|---|
| C03C 3/083 | (2006.01) |
| C03C 3/085 | (2006.01) |
| C03C 3/087 | (2006.01) |
| C03C 3/093 | (2006.01) |
| C03C 3/095 | (2006.01) |
| C03C 4/18 | (2006.01) |
| C03C 17/22 | (2006.01) |
| C03C 17/245 | (2006.01) |
| C03C 21/00 | (2006.01) |

(52) U.S. Cl.
CPC .............. *C03C 3/085* (2013.01); *C03C 3/087* (2013.01); *C03C 3/093* (2013.01); *C03C 3/095* (2013.01); *C03C 4/18* (2013.01); *C03C 17/245* (2013.01); *C03C 21/002* (2013.01); *C03C 17/225* (2013.01); *C03C 2204/00* (2013.01); *C03C 2217/214* (2013.01); *C03C 2217/281* (2013.01); *C03C 2218/15* (2013.01)

(56) References Cited

U.S. PATENT DOCUMENTS

| | | |
|---|---|---|
| 9,156,724 B2 | 10/2015 | Gross |
| 9,292,634 B2 | 3/2016 | Ahmed et al. |
| 9,586,858 B2 | 3/2017 | Bellman et al. |
| 10,487,009 B2 | 11/2019 | Decker et al. |
| 2010/0000259 A1 | 1/2010 | Ukrainczyk et al. |
| 2011/0187245 A1 | 8/2011 | Pakula et al. |
| 2012/0282449 A1 | 11/2012 | Gross |
| 2012/0297828 A1 | 11/2012 | Bailey et al. |
| 2013/0125588 A1 | 5/2013 | Kladias et al. |
| 2013/0323444 A1 | 12/2013 | Ehemann et al. |
| 2014/0234581 A1 | 8/2014 | Immerman et al. |
| 2014/0331716 A1 | 11/2014 | Ahmed et al. |
| 2014/0335322 A1 | 11/2014 | Luo et al. |
| 2015/0047393 A1* | 2/2015 | Luo ..................... C03B 23/0235 65/102 |
| 2015/0239775 A1 | 8/2015 | Amin et al. |
| 2016/0083835 A1* | 3/2016 | Adib ..................... C23C 16/308 428/332 |
| 2016/0107928 A1* | 4/2016 | Bayne ..................... C03C 17/25 428/432 |
| 2017/0274416 A1* | 9/2017 | Yeom ..................... C03C 17/22 |
| 2019/0039946 A1 | 2/2019 | Bayne et al. |

FOREIGN PATENT DOCUMENTS

| | | |
|---|---|---|
| CN | 105269891 A | 1/2016 |
| CN | 105358500 A | 2/2016 |
| DE | 112010005568 T5 | 4/2013 |
| KR | 10-2013-0087558 A | 8/2013 |
| WO | 2014/059411 A1 | 4/2014 |
| WO | 2014/182641 A1 | 11/2014 |
| WO | 2016/033138 A1 | 3/2016 |
| WO | 2016/115311 A1 | 7/2016 |

OTHER PUBLICATIONS

International Search Report and Written Opinion of the International Searching Authority; PCT/US2018/063032; Mailed Mar. 8, 2019; 16 Pages; European Patent Office.

Ostrowicki et al., "A stress-based effective film technique for wafer warpage prediction of arbitrarily patterned films", 2014 IEEE 64th Electronic Components and Technology Conference (ECTC), May 1, 2014, pp. 821-828.

* cited by examiner

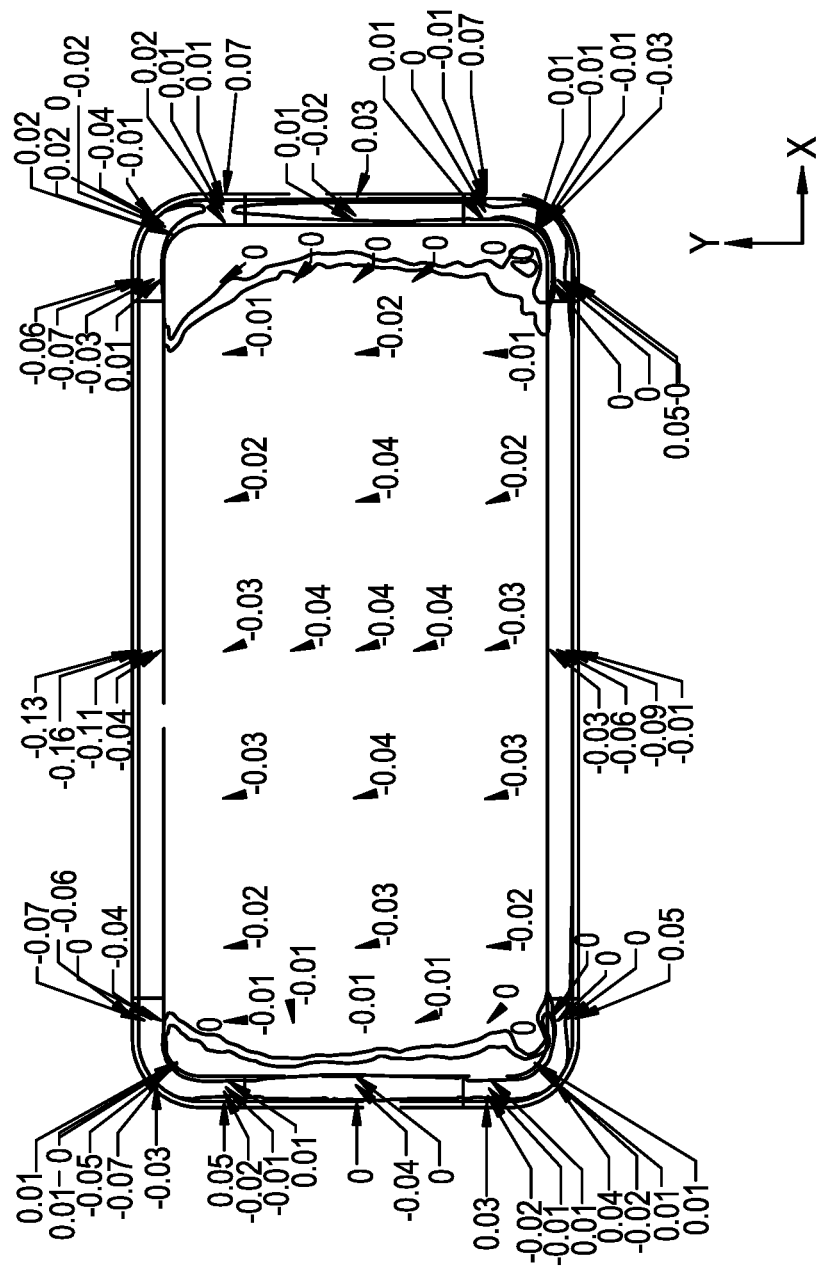

METHODS OF MAKING COATED GLASS-BASED PARTS

CROSS-REFERENCE TO RELATED APPLICATIONS

This application is a national stage entry of International Patent Application Serial No. PCT/US2018/063032, filed on Nov. 29, 2018, which in turn, claims the benefit of priority under 35 U.S.C. § 119 of U.S. Provisional Application Ser. No. 62/592,066 filed on Nov. 29, 2017, the contents of each of which are relied upon and incorporated herein by reference in their entireties.

FIELD

Embodiments of the disclosure generally relate to methods of making coated glass-based parts such as glass-based covers.

BACKGROUND

Glass-based articles, in particular, strengthened glass-based articles are widely used in electronic devices as cover plates or windows for portable or mobile electronic communication and entertainment devices, such as mobile phones, smart phones, tablets, video players, information terminal (IT) devices, laptop computers, navigation systems and the like, as well as in other applications such as architecture (e.g., windows, shower panels, countertops etc.), transportation (e.g., automotive, trains, aircraft, sea craft, etc.), appliance, or any application that would benefit from superior fracture resistance but thin and light-weight articles. Strengthened glass-based articles, such as chemically strengthened glass-based articles, for example, covers for mobile phones, wearables (e.g. watches), and other electronic devices, shapes and geometries can be non-planar (for example, "three-dimensional" or "3D" and "2.5 dimensional"), containing some out-of-plane shapes, e.g., LG® Curve phone cover glass and Samsung® Edge cover glass. Such 2.5D and 3D shaped glass poses great challenges to the forming and reliability of the cover glass-based parts.

FIG. 1 shows a representative, non-limiting, shape for a 3D glass-based cover (also known in the art as a 3D glass), which can be used with an electronic device, such as, a telephone, television, tablet, monitor, or the like. As shown in this figure, 3D glass-based article in the form of a cover 100 includes a planar central portion 101, a perimeter portion 102, and a perimeter edge 103. Planar central portion 101 is flat or nearly flat. Perimeter portion 102 extends out of the plane of the planar central portion 101, thus providing the glass cover with an overall three-dimensional shape, as opposed to a two-dimensional shape. Although as shown in FIG. 1, perimeter portion 102 completely surrounds central portion 101, in some embodiments, the perimeter portion can extend around a portion of the central portion, i.e., less than the entire perimeter, e.g., for a glass cover having a rectangular shape, less than all four sides of the glass cover can include a perimeter portion, e.g., two sides can have a perimeter portion and the other two sides can be flat or substantially flat. The perimeter edge 103 defines an edge-to-opposite edge dimension D1 and an edge-to-opposite edge dimension D2. Likewise, to be three-dimensional, a glass cover in the form of a disc or saucer may have a portion (including only some, or all) of its flat or nearly flat central portion transition into a perimeter portion which extends out of the plane of the flat or nearly flat central portion.

As will be evident, the shape of a 3D glass cover can vary widely depending on the desires of the designer of the device with which the 3D glass cover will be used. Thus, the 3D glass cover can have a variety of overall shapes and can include central portions and perimeter portions of various sizes and shapes, and can employ transitions of various configurations between the central and perimeter portions. Commonly-assigned U.S. application Ser. No. 13/774,238 entitled "Cover Glass Article" filed Feb. 22, 2013, published as U.S. Patent Application Publication No. 2013/0323444, the contents of which are incorporated herein by reference, provides various representative dimensions for 3D glass covers, as well as descriptions of typical applications for the covers.

The transverse dimension (thickness) of perimeter edge 103 corresponds to the thickness of the glass-based sheet from which the glass-based cover is made, which is typically less than 1 millimeter, e.g., 0.8 millimeters or less, 0.7 mm or less, 0.6 mm or less, 0.5 mm or less, 0.4 mm or less, 0.3 mm or less, 0.2 mm or less, 0.1 mm or less, 75 micrometers (microns, or μm) or less, 50 microns or less, on down to 10 microns. If a functional coating (e.g., scratch resistant or antireflective coating) is applied to the shaped 2.5D and 3D glass-based parts, residual stress of functional coating can cause the shape to warp, causing the parts to be out of specification for dimensional tolerance. And this effect is greater as the glass gets thinner.

Therefore, it would be desirable to provide methods for manufacturing glass-based parts having a coating with mechanical and optical performance as well as maintaining the 2.5D and 3D parts shape application of the coating within the dimensional tolerances. In addition, it would be desirable to provide methods for manufacturing chemically strengthened (e.g., ion-exchanged) glass-based articles which have a coating with mechanical and optical performance as well as keep the 2.5D and 3D parts shape after coating application within the dimensional tolerance.

SUMMARY

A first aspect of the disclosure pertains to making a glass-based articles having a coating and a predetermined target shape which comprises a planar central portion and a perimeter portion which borders at least part of the planar central portion and extends out of the plane of the planar central portion, the perimeter portion having a perimeter edge and a target edge-to-opposite edge dimension. The method includes forming a glass-based part (also referred to as a glass-based article or glass-based substrate) to provide an initial formed part having an initial three-dimensional shape that is different from the target shape for at least the target edge-to-opposite edge dimension. A coating is applied to the initial formed part to form the glass-based article having a coating, the coating imparting a stress to the initial molded part that causes a calculated, warp-induced change (i.e., a predetermined calculated, warp-induced change) to the initial shape.

Another aspect of the disclosure pertains to a method of making a glass-based article comprising forming an initial molded part using a mold having a molding surface, the initial molded part having a pre-coating three-dimensional shape which comprises a planar central portion and a perimeter portion which borders at least part of the planar central portion and extends out of the plane of the planar central portion to provide the initial molded part with three dimensionality, the perimeter portion having a perimeter edge and a pre-coating edge-to-opposite edge dimension;

and coating the initial molded part with a coating to form the glass-based article, the coating imparting a stress on the initial molded part that warps the initial molded part and changes the pre-coating edge-to-opposite edge dimension of the initial molded part to provide a target edge-to-opposite edge dimension that is different from the pre-coating edge-to-opposite edge dimension, the target edge-to-opposite edge dimension being equal to a calculated value based on a modeling calculation taking into account coating thickness, coating Young's modulus and initial molded part thickness.

Another aspect of the disclosure pertains to a method of modeling dimensional changes to an initial glass-based part resulting from stress imparted by a coating on the initial glass-based part that warps the part, the method comprising generating, on a computer, a model that incorporates a coating thickness, a coating Young's modulus, a glass-based material thickness and a glass-based material Young's modulus; performing, on a computer, a finite element analysis using the model, wherein performing the finite element analysis comprises determining, the initial glass-based material formed part having a pre-coating shape which comprises a planar central portion and a perimeter portion which borders at least part of the planar central portion and extends out of the plane of the planar central portion, the perimeter portion having a perimeter edge and a pre-coating edge-to-opposite edge dimension; and determining on a computer, based on the model, a quantitative change to the pre-coating edge-to-opposite edge dimension of the initial glass-based formed part resulting from the compressive stress imparted by the coating which results in a target edge-to-opposite edge dimension.

BRIEF DESCRIPTION OF THE DRAWINGS

FIG. 7A illustrates a cover part shape as measured prior to ion exchange;

DETAILED DESCRIPTION

Figure 1:
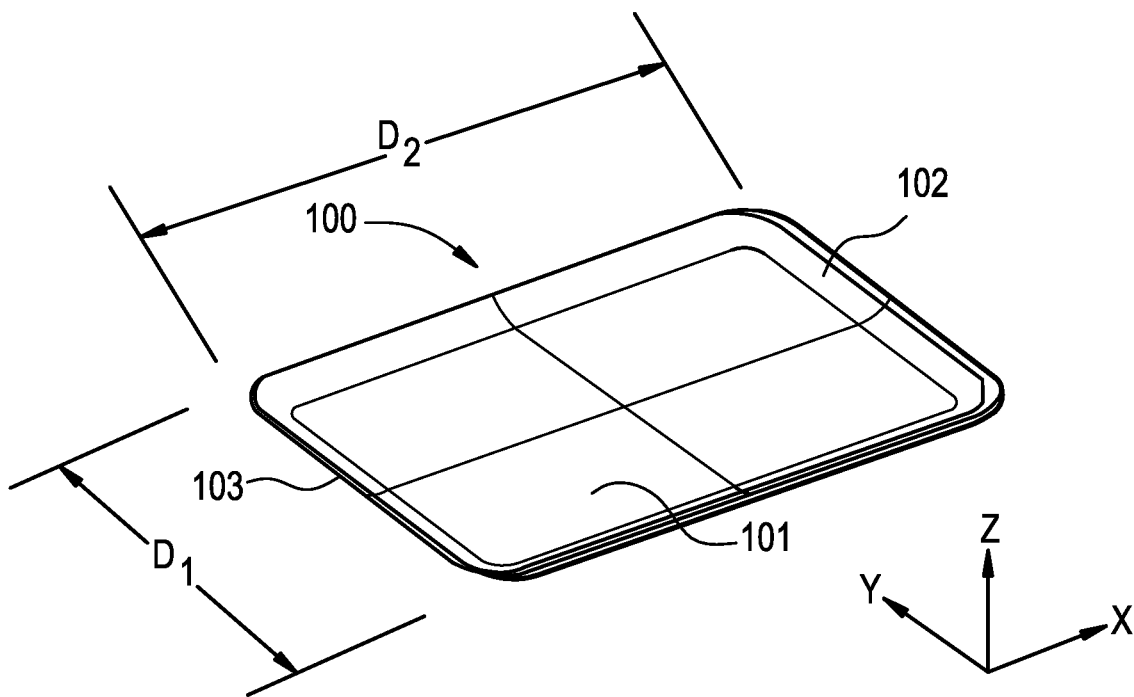
FIG. 1 is a perspective view of a representative 3D glass cover.

Before describing several exemplary embodiments, it is to be understood that the disclosure is not limited to the details of construction or process steps set forth. The disclosure provided herein is capable of other embodiments and of being practiced or being carried out in various ways.

Reference throughout this specification to "one embodiment," "certain embodiments," "some embodiments," "various embodiments," "one or more embodiments," or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment," "in some embodiments," or "in an embodiment" in various places throughout this specification are not necessarily referring to the same embodiment. Furthermore, the particular features, structures, materials, or characteristics described in connection with one embodiment may be combined in any suitable manner in one or more other embodiments. The various glass-based articles and methods described herein can be selected from an architectural glass-based substrate, a vehicle glazing, a vehicle interior glass-based substrate, an appliance glass-based substrate, a handheld device glass-based substrate (such as a part used as a screen cover), and a wearable device glass-based substrate.

One or more embodiments of the disclosure provide glass-based articles including a glass-based substrate having an initial shape and a coating on the glass-based substrate. In one or more embodiments, the coating imparts a stress to the initial formed part that causes a calculated, warp-induced change (i.e., a predetermined calculated, warp-induced change) to the initial shape. Coatings can include multi-layer coatings. The glass-based parts or substrates can be planar, or they can be curved in one or more directions (e.g., x, y and/or z planes) to provide a three-dimensional substrate or part. The glass-based substrates or parts can be cold-formed. In one or more embodiments, the substrates or parts are curved in at least one direction (e.g., x, y and/or z planes). In one or more embodiments, the glass-based substrates or parts can have 2.5-dimensionality, for example, by having beveled edges.

According to one or more embodiments, coated glass-based articles are provided. In one or more embodiments, glass-based articles include a coating applied for functions such as scratch resistance, protection from damage, such as sharp contact induced fracture, antimicrobial properties, antireflective properties, capacitive touch sensitivity, photochromic coatings, or other optical qualities. The coatings can be applied by any suitable technique, such as, chemical vapor deposition (CVD) (e.g., plasma enhanced CVD, low-pressure CVD, atmospheric pressure CVD, and plasma-enhanced atmospheric pressure CVD), physical vapor deposition (PVD) (e.g., reactive or nonreactive sputtering or laser ablation), thermal or e-beam evaporation and/or atomic layer deposition. The coatings can also be applied by dip-coating, spraying, brushing, spin-coating and other suitable techniques to apply coatings.

Provided herein are methods of producing coated glass-based articles such as covers for electronic devices having a shape that corresponds closely to that specified by the designer of the article (the target shape; also referred as the "predetermined target shape" or the "CAD shape" (CAD refers to Computer Aided Design) in cases where the shape is specified through a CAD drawing). After application of a coating that imparts a stress to the surface of the coated part, a 2.5D and 3D glass-based article tends to warp. Warping happens because the coating imparts a stress to the glass-based article. This causes the glass's dimensions to increase or decrease, depending on whether the coating imparts a tensile stress or a compressive stress to the surface of the glass-based article, and depending on the side of the glass-based article to which the coating is applied. To determine if the dimensions of the glass-based article increase or decrease, for example in one or both of an x-plane or y-plane, the dimensions of the glass-based article prior to coating and after coating are measured.

Shape deviation as a result of coating-induced warp is not desirable as customer specifications on dimensional tolerances can be ±100 microns or less. To compensate for this coating-induced warp, methods are provided to calculate degree of change of the dimensions to the glass-based parts in advance, to provide a calculated-warp-induced change (i.e., a predetermined calculated, warp-induced change) to the initial shape and dimensions. As used herein, a "predetermined" change means that the results of the change have been calculated in advance of applying the change to the part. As used herein, a "predetermined" shape means that the shape of the article has been calculated in advance of creating the article with the resulting shape.

Because coating-induced warp depends on the details of the overall shape of the glass-based article, as well as on details of the shape and thickness of the article's edge, in general, correction values are obtained by transforming the coating-induced warp problem into a thermal diffusion problem, thus allowing the coating-induced warp problem to be solved using commercially-available software, e.g., ANSYS® software sold by ANSYS Inc., 275 Technology Drive, Canonsburg, PA 15317, USA, which employs finite element and graphical display techniques. Also, target shapes and, in particular, the predetermined target shape or CAD-formatted target shapes, can be inputted to such commercially-available software. In practice, using the technology disclosed herein, molds which are used to form the glass-based parts can be provided with mold contour corrections, which can be developed without the need for repeated iterative changes to physical molds.

In some embodiments, the 3D glass-based article is made from a 2D glass sheet using a thermal reforming process such as described in U.S. Patent Application Publications Nos. 2010/0000259 and 2012/0297828, both incorporated herein by reference. In some embodiments, the 2D glass sheet is made by a fusion process, although 2D glass sheets made by other processes, such as by float, down draw, updraw, or rolling processes, may also be used.

Thus, an initially formed glass-based part can be formed into a 3D shaped glass-based article through thermal forming process, such as by molding. This initially formed part can then be coated. In one or more embodiments, prior to coating, the parts may be chemically strengthened by ion exchange, which may induce ion exchange warp. Thus, in embodiments in which the parts are ion exchanged, both ion exchange-induced warp and coating-induced warp will be determined/calculated prior to manufacturing to determine the magnitude of the dimensional change to the initially formed part. In one or more embodiments, the method includes forming the glass-based article in a mold having a molding surface, and the molding surface is designed and sized to compensate for the calculated, warp-induced change (i.e., a predetermined calculated, warp-induced change) to the initial shape such that the glass-based article having the coating has the target shape (i.e., predetermined target shape) and the target edge-to-opposite edge dimension. In one or more embodiments, an initially formed part may have three-dimensionality or curvature, and a coating which imparts a stress to the coated part having an initial shape is applied to remove curvature from the initially formed part to provide a final coated part having a flat shape.

Figure 2:
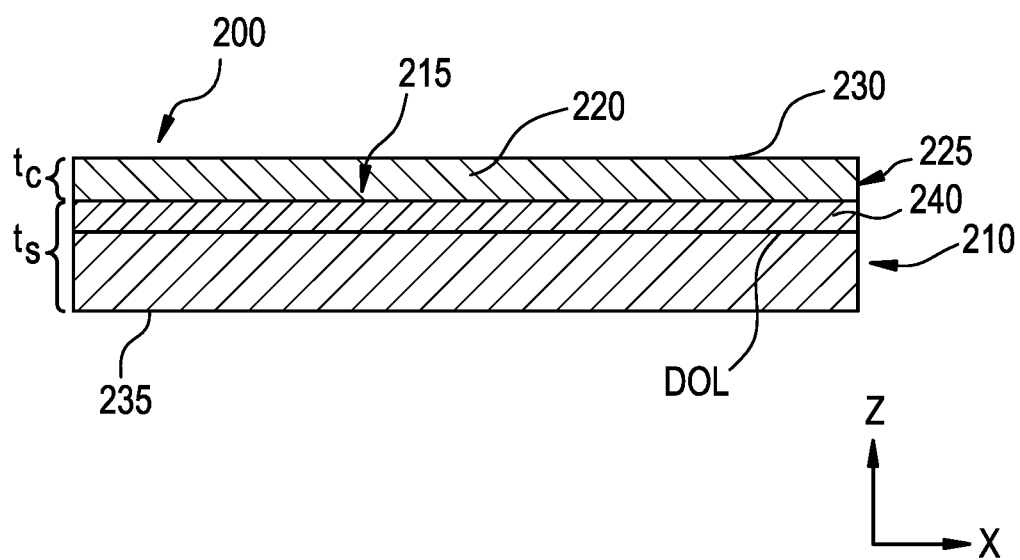
FIG. 2 illustrates of a strengthened glass-based substrate having a coating on one side according to some embodiments.

Referring now to FIG. 2, embodiments of the disclosure pertain to a coated glass-based article 200, for example, a glass-based cover comprising a glass-based substrate 210 having a first surface 215 having first coating 220 thereon providing a first interface 225 between the first coating 220 and the glass-based substrate 210 and a second surface 235 opposite first surface 215. The first coating 220 has a first coating thickness $t_c$ extending from a first coating surface 230 to the first surface 215. The glass-based substrate 210 has a substrate thickness $t_s$ extending from the first surface 215 to the second surface 235. The substrate thickness is in a range of from 0.01 millimeters (mm) to 3 millimeters, for example, from 0.01 mm to 2.75 mm, from 0.01 mm to 2.5 mm, from 0.01 mm to 2.25 mm, from 0.01 mm to 2.0 mm, from 0.01 mm to 1.75 mm, from 0.01 mm to 1.5 mm, from 0.01 mm to 1.25 mm, from 0.01 mm to 1.0 mm, from 0.01 mm to 0.75 mm, from 0.01 mm to 0.5 mm, from 0.025 mm to 3.0 mm, from 0.05 mm to 3.0 mm, from 0.075 mm to 3.0 mm, from 0.1 mm to 3.0 mm, from 0.2 mm to 3.0 mm, from 0.3 mm to 3.0 mm, from 0.05 mm to 2.5 mm, from 0.075 mm to 2.0 mm, from 0.1 mm to 1.75 mm, from 0.1 mm to 1.5 mm, from 0.1 mm to 1.25 mm, from 0.1 mm to 1.1 mm, from 0.2 mm to 1.1 mm, from 0.2 mm to 1.0 mm, from 0.2 mm to 1.0 mm, from 0.4 mm to 1.0 mm, from 0.5 mm to 1.0 mm, 0.6 mm to 1.0 mm, 0.7 mm to 1.0 mm, or 0.8 mm to 1.0 mm. The first coating 220 imparts a stress on the glass-based substrate 210. The first coating 220, which can be on the first surface 215 or the second surface 235 of the substrate 210 has a coating thickness $t_c$ in a range of about 80 nanometers to 10 micrometers. In some embodiments, the glass-based article is not strengthened. In the FIG. 2, the glass-based substrate 210 has a compressive stress region 240 extending from the first surface 215. The compressive stress region has a surface compressive stress (CS) of from about 750 MPa up to about 1200 MPa at a surface of the glass-based article and extends to a depth of compression (DOC) at which point the stress turns from compressive to tensile. The first coating 220 in one or more embodiments imparts a compressive stress to the substrate 210. In other embodiments, the first coating 220 imparts a tensile stress to the substrate 210. Depending on the desired final part shape, a tensile-stress-inducing or compressive-stress-inducing coating may be selected and applied to at least one of the first surface 215 and second surface 235, which will impart a stress on the substrate 210, changing an initial shape of the part to cause a calculated, warp-induced change to the part shape and an edge-to opposite edge dimension of the initially formed part.

Figure 3:
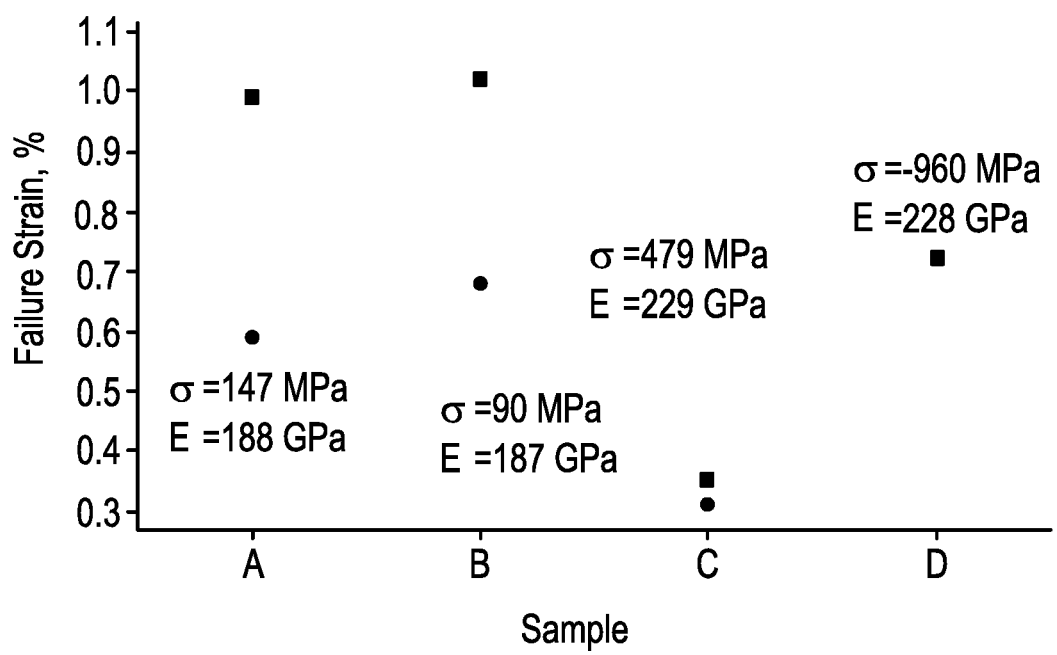
FIG. 3 is a graph showing measured Failure Strain versus thickness of a glass-based substrates including a coating.

FIG. 3 is a graph showing measured Failure Strain versus thickness for hard, brittle coatings applied to chemically strengthened glass. FIG. 3 shows the importance of the coating state of stress, and coating thickness on increasing the robustness of the coating as well as the robustness of the underlying substrate, as measured by Failure Strain %. In general, as Failure Strain % increases, the object will be more robust and damage resistant. The circular data points represent Failure Strain of the coating, whereas the square data points represent Failure Strain of the substrate itself. All samples had the same underlying substrate composition, thickness, and stress profile. For Sample D, the coating and substrate Failure Strains were substantially the same at about 0.7%. Samples A and B both had a 460 nm thick coating, wherein the coatings both had a Young's Modulus (E) of about 188 GPa. Samples C and D had an 1160 nm thick coating, wherein the coating had a Young's Modulus (E) of about 229 GPa. The coating stress ($\sigma$) for coatings C, B, A, and D, respectively were 479 MPa (tensile), 147 MPa (tensile), 90 MPa (tensile), and −960 MPa (compressive). Comparing coatings of the same thickness and Young's Modulus shows that a stress that is more compressive (less tensile) leads to an increase in Failure Strain in both the coating and the substrate. For example, coatings A and B had the same thickness and Young's Modulus, but coating A (having the less tensile stress) had an increased Failure Strain. Similarly, coatings C and D had the same thickness and Young's Modulus, but coating D (having the less tensile stress) had an increased Failure Strain. Also from FIG. 3 it can be seen that thinner coatings lead to an increase in Failure strain, particularly in the underlying substrate. For example, comparing Samples A and B (each having a thickness of 460 nm) with Sample C (having a thickness of 1160 nm), it is seen that the Failure Strain in both the coating and underlying substrate are increased in the samples having the thinner coating. Similarly, comparing Samples A and B (each having a thickness of 460 nm) with Sample D (having a thickness of 1160 nm), it is seen that the Failure Strain in the underlying substrate is increased in the samples having the thinner coating. Thus, in general, thinner, less tensile coatings tend to produce products having more robust coatings as well underlying substrates.

Figure 4:
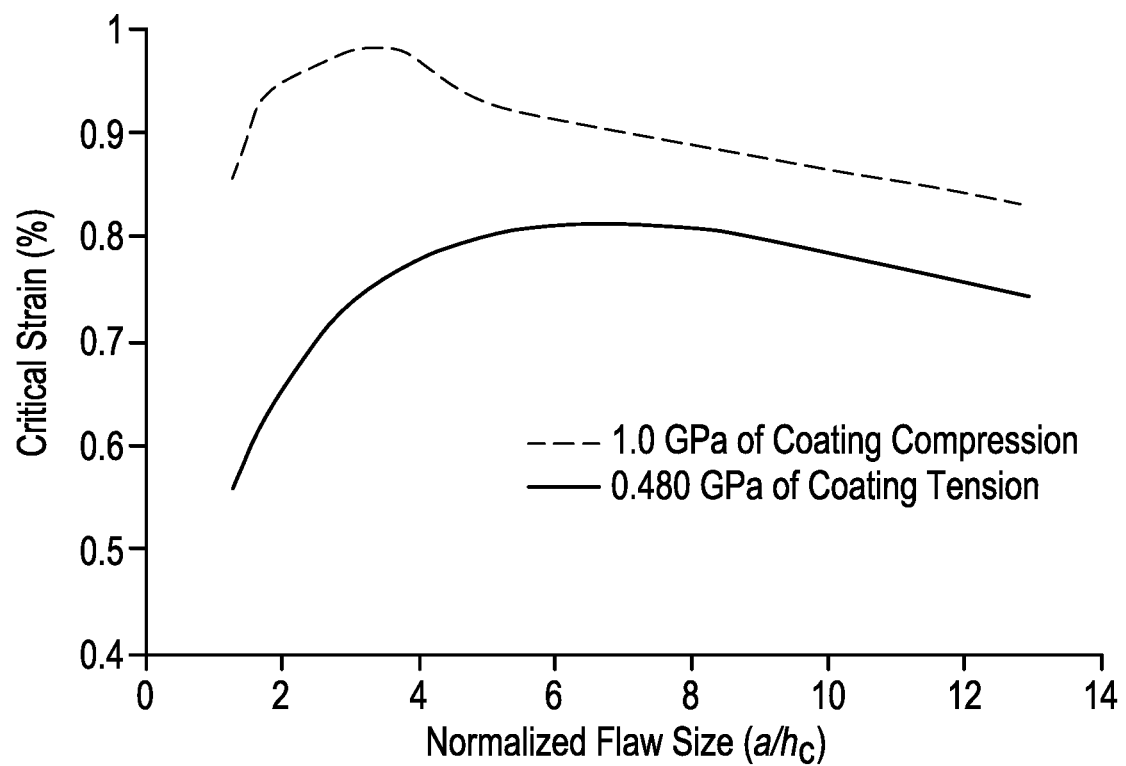
FIG. 4 is a graph based on modeling showing critical strain percentage versus normalized flaw size.

FIG. 4 shows modeled results of critical strain plotted versus normalized flaw size. Similar to Failure Strain, Critical Strain is a measure of substrate and coating robustness. In general, the higher the Critical Strain, the more robust (less likely to fail, for example by cracking, because it is harder for flaws to propagate) the object (either substrate, coating, or coated substrate) will be. FIG. 4 shows the Critical Strain for the underlying glass substrate itself when coating by a 1.1 micron thick coating. The solid line represents a coating having a tensile stress of 0.48 GPa, whereas the dashed line represents a coating having a compressive stress of 1.0 GPa. Similarly to FIG. 3, FIG. 4 shows that making the coating less tensile provides a more robust coated substrate.

Figure 5:
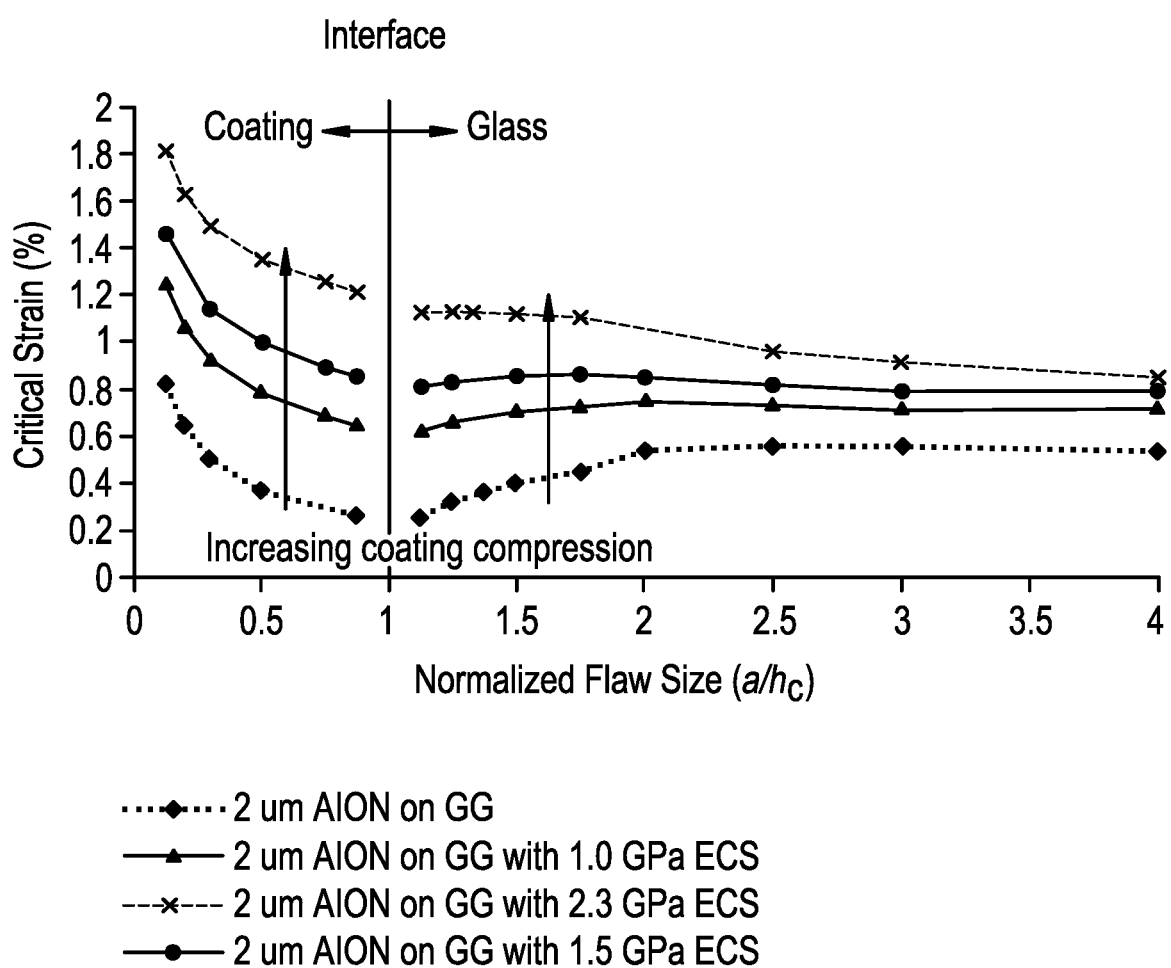
FIG. 5 is a graph based on modeling showing critical strain % versus normalized flaw size.

Further modeling work was performed with 2.0 μm thick coatings, as shown in FIG. 5. Similar improvements, as those shown in both FIGS. 3 and 4, were found in both the coating and substrate robustness, here measured as Critical Strain. More particularly, all coatings had the same 2 micrometer thickness, were the same material (AlON), and were modeled on a substrate having the same composition, thickness, and stress profile. FIG. 5 shows, similarly to FIGS. 3 and 4, that for a given coating thickness, as coating stress becomes less tensile, the sample becomes more robust. And FIG. 5 demonstrates this relationship over all Normalized Flaw Sizes. Further, comparing FIGS. 4 and 5, it is again seen that thinner coatings have a greater improvement on sample robustness. In particular, FIG. 4 shows that the thinner (1.1 micron) coating having 1.0 GPA of coating compression has a Critical Strain of about 0.95% for a Normalized Flaw Size of 4. On the other hand, FIG. 5 shows that a thicker coating (2 microns) having 1.0 GPa of compressive stress (triangular data points) had a Critical Strain under 0.8% for a Normalized Flaw Size of 4.

Accordingly, from FIGS. 3-5, it is seen that appropriately choosing a coating, in terms of its thickness, and its stress level, can beneficially influence the robustness of the coated substrate. Thus, more compressive coatings are desirable.

Also, it is believed that incremental improvements in drop performance can be gained through modest increases in glass compressive stress. Therefore, it follows that increases in the AlON coating compression (as well as compression in other types of coatings) may improve the resistance to sharp damage contact during drop events, thus improving drop performance. Coating compression is predicted to improve the crack onset strain of the coating and the flexural strength of the glass.

Coating compression or tension can be obtained through variation of coating deposition parameters, or by a mechanical means. For example, in one or more embodiments, a difference in coefficient of thermal expansion (CTE) or temperature difference between the coating and the glass-based part can be used to increase or decrease coating compression or tension. For instance, if the coating has a lower CTE than the underlying glass-based part, the coating can exert a compressive force on the underlying part. In one or more embodiments, high energy coating deposition can be utilized to provide a dense, tightly backed coating, which will result in a compressive stress on the underlying glass-based part. Coating density can be controlled by changing the coating deposition parameters.

However, a compressive coating will impart a compressive force to the glass-based substrate, which will warp the part and change the dimensions of the part from the initially formed dimensions, and high magnitudes of coating compressive stress are currently perceived as undesirable due to part warp. However, warp naturally occurs during forming from snap-back, thermal gradient effects, and chemical strengthening of non-symmetric, three-dimensional machined or mold-formed parts. Snap back and thermal gradient work can be controlled through process adjustments and control. However, warp due to ion exchange is caused by re-equilibration of stresses which causes distortion because of the non-symmetric, through-thickness shape. Therefore, ion exchange-induced warp of mold-formed parts can be addressed by compensating the mold shape such that the part returns to the final, desired shape following the ion exchange process as described in U.S. Pat. No. 9,292,634, the entire content of which is incorporated herein by reference. Because the coating deposition induced warp is caused by compressive stress or tensile stress in the coating that leads to re-equilibration, the final shape of a coated glass-based article such as a glass-based cover is predictable through modeling. A warp-compensated mold can be designed to allow for the part to reach its desired shape after both the coating application and ion exchange. A similar process can be performed for molding of non-three-dimensional parts to create a shape that becomes flat following the application of the coating. However, the application of the method to three-dimensional parts adds no additional steps to the process.

Part warp can be estimated using Stoney's equation for flat plates with thin coatings. While the disclosure is primarily targeted at 3D applications, it can also be applied to 2.5D parts (e.g., parts with beveled edges) and to flat substrates. Additionally, studying flat plate warp for two-dimensional plates can provide insight into the warp that might be created in a formed three-dimensional part. Results from Stoney's equation are given in FIG. 6 and it can be seen that the curvature (K) is dependent on both the coating thickness and stress. Stoney's equation is given in Equation 1:

$$K = \frac{6\sigma^{(f)} h_f (1 - v_s)}{E_s h_s^2}, \quad (1)$$

where K represents curvature, $\sigma^{(f)}$ represents stress imparted by the coating on the glass-based molded part, $h_f$ represents coating thickness, $v_S$ represents Poisson's ratio of the glass-based molded part, $E_S$ represents Young's modulus of the glass-based molded part, $h_s$ represents thickness of the glass-based molded part. Predicted substrate curvature (K) can be determined for glass-based parts of varying coating thickness and coating stress based on Stoney's equation, with $E_S$=65 GPa.

Figure 6:
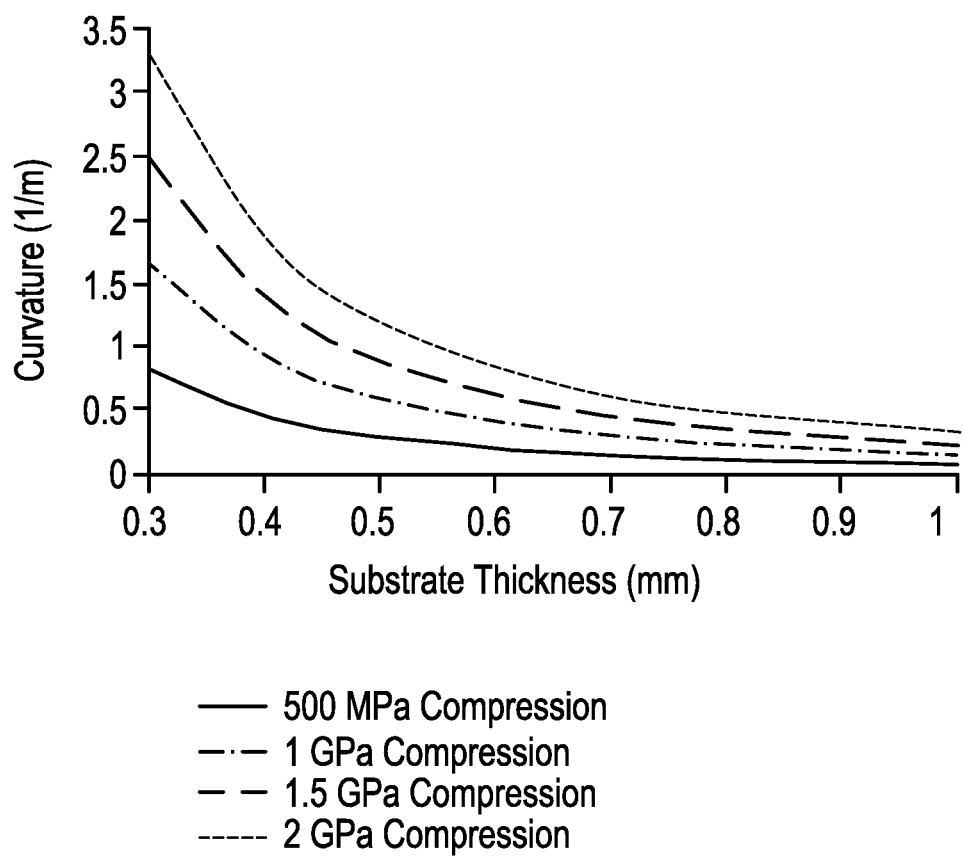
FIG. 6 is a graph showing predicted substrate curvature versus substrate thickness for parts having various coating thicknesses.

As can be seen from equation (1) and FIG. 6, the curvature (K) increases with the inverse of the substrate thickness (h) squared. As covers for electronic devices such as mobile phones become thinner, the coating stress state becomes more influential, and the curvature created by the coating increases. Curvature increases linearly with the coating stress, as well (e.g., as coating stress increases, from 500 MPa compressive stress to 2 GPa compressive stress, curvature (K) increases for a given thickness of substrate). This, again, shows that a more compressive stress (less tensile stress) in the coating is beneficial for the robustness of the coated substrate. But again, as coating compression increases, the warp of the substrate increases. Thus, to get the benefit of the increasing coating compression, and still maintain the desired part shape, the warp of the coating is compensated for according to the present disclosure.

Figure 7B:
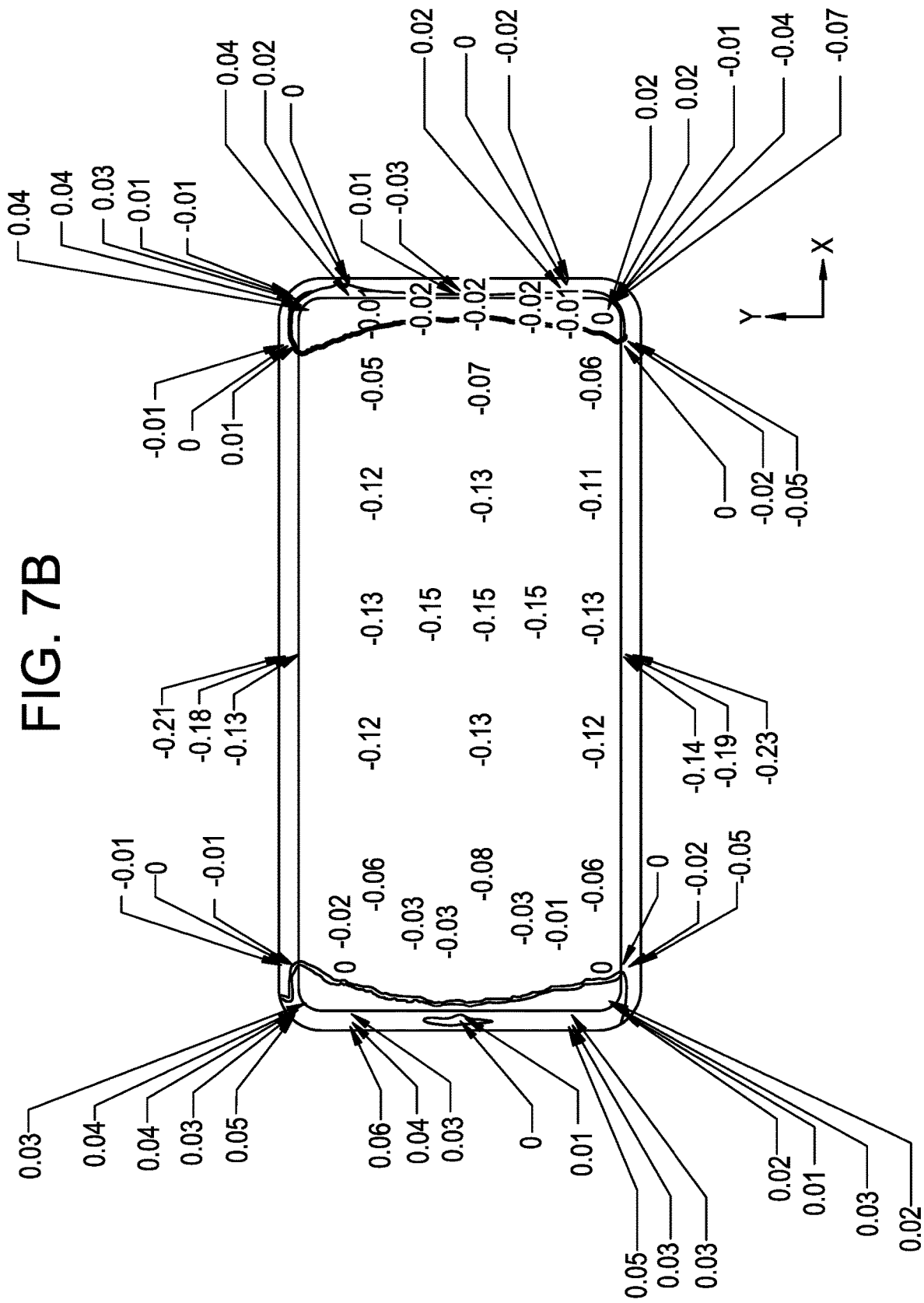
FIG. 7B illustrates a cover part shape as measured after ion exchange.

FIGS. 7A and 7B demonstrate experimental measurements of the warp created by ion exchange on a non-warp compensated part. FIG. 7A shows the shape before ion exchange, and FIG. 7B shows the deviations to CAD shape dimensions in millimeters after ion exchange. More particularly, the numbers in each of these figures represent the position of the substrate surface as a distance from a given reference plane. Thus, in the center of FIG. 7A it is seen that the substrate surface deviates by 0.04 mm from the reference plane. On the other hand, in FIG. 7B it is seen that the same central portion of the substrate deviates from the reference plane by 0.15 mm. Comparing these values for the central portion of FIG. 7A with the same central portion of FIG. 7B it is seen that ion exchange has caused an additional deviation of 0.11 mm (e.g., 0.15−0.4=0.11). Accordingly, the part shape can vary as much as about 0.1 mm or more after the ion exchange, particularly on the portion thereof which is desired to be flat, for example, the main portion of the display screen (as opposed to the already curved perimeter edges). Such shape change can cause the part to be outside of the tight geometric dimensional tolerances. This warpage from ion exchange is in addition to that caused by the stress in the coating itself. However, both these warps can be compensated for by adjusting the shape of the substrate (relative to the target shape—the predetermined target shape) before performing the ion exchange and coating.

Figure 8:
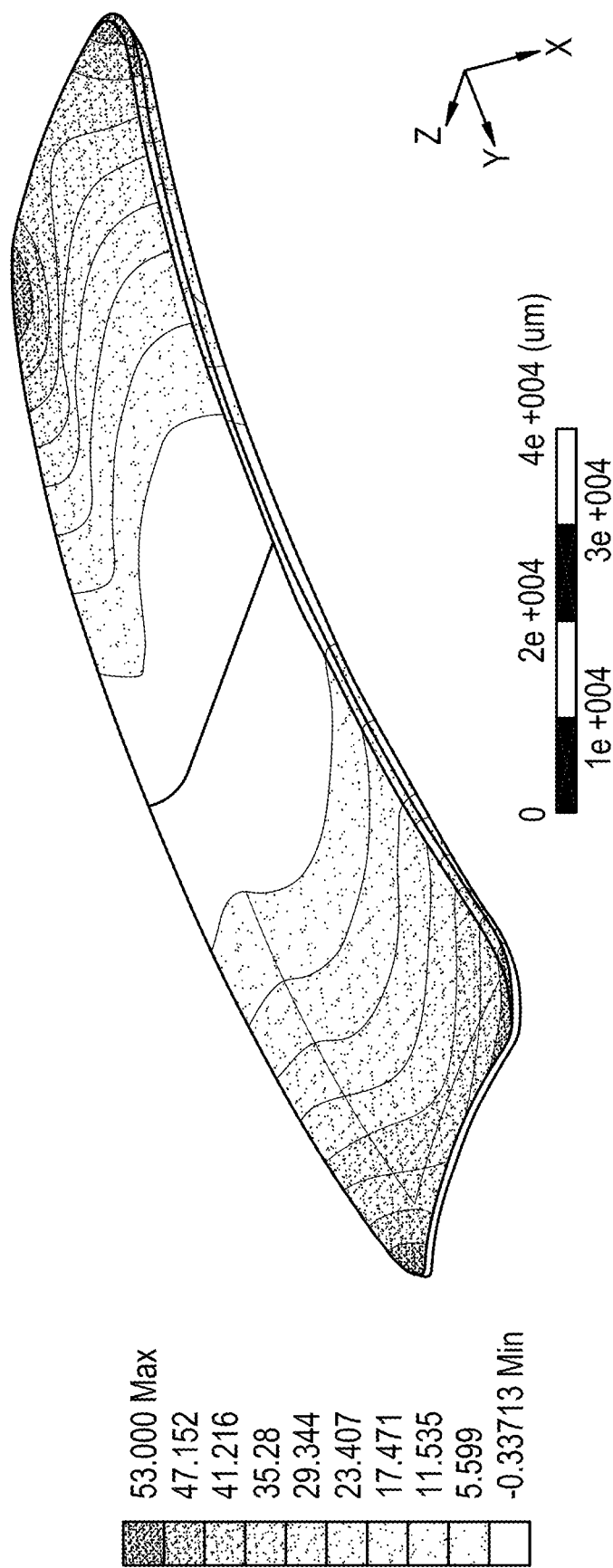
FIG. 8 illustrates a modeled finite element analysis plot showing warp of a dish-shaped part after ion exchange.

A simulation of the ion exchange process, through a thermal diffusion analogy, is shown in FIG. 8, based on finite element analysis results for warp of dish-shaped parts after ion exchange. Warp magnitude is not scaled to part size in FIG. 8 and dimensions are provided in microns. With knowledge gained from such modeling, a mold can be warp-compensated to produce parts that meet tight tolerances. That is, the warp induced by ion exchange can be fairly accurately predicted so that compensation for that warp (as well as the warp induced by coating) can be compensated for to produce the desired target shape in the part.

Figure 9:
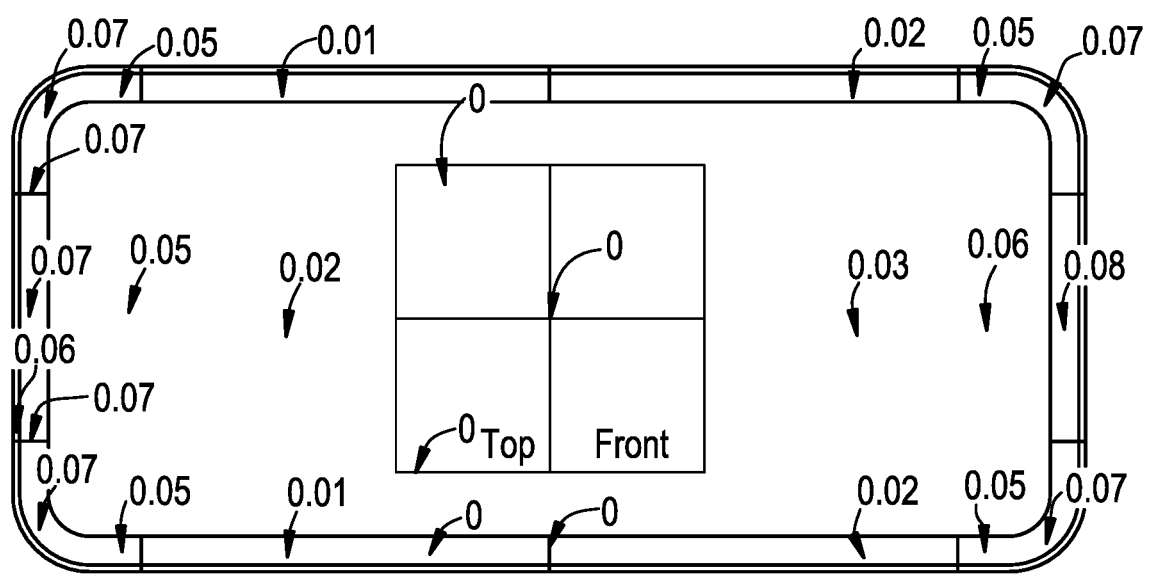
FIG. 9 illustrates shape change measurements of a warp-compensated part produced by a warp-corrected mold.

An example of an ion exchange, warp compensated part is shown in FIG. 9, where dimensions are in millimeters. Again, similar to FIGS. 7A and 7B, the numbers at each position of the part represent the deviation of that position from a reference plane. In FIG. 9, however, the before ion-exchange and after ion-exchange measurements are represented on the same figure as simply the difference between the two. Accordingly, for the center of the part in FIG. 9, there is a shape change of 0, as opposed to the shape change of 0.11 mm for the FIGS. 7A and B example. That is, the compensated part (FIG. 9) is much flatter, i.e., has a smaller out of plane deformation, than the uncompensated part (FIG. 7B). Similar mold corrections can be directly applied to the shape changes caused by coating residual stress. The coating-deposition-induced curvatures, which are shown in FIG. 6, and ion-exchange-induced displacements shown by FIGS. 7A and 7B, can be corrected using the method described herein to produce a part within target geometric tolerances, similarly to the process used to produce the part shown in FIG. 9.

The disclosure herein provides methods to improve the performance of the coating and substrate of a composite system. Coating survivability is an attribute for device functionality and user experience, while part or cover survivability is an attribute in preventing cover glass system-level failure.

Figure 10:
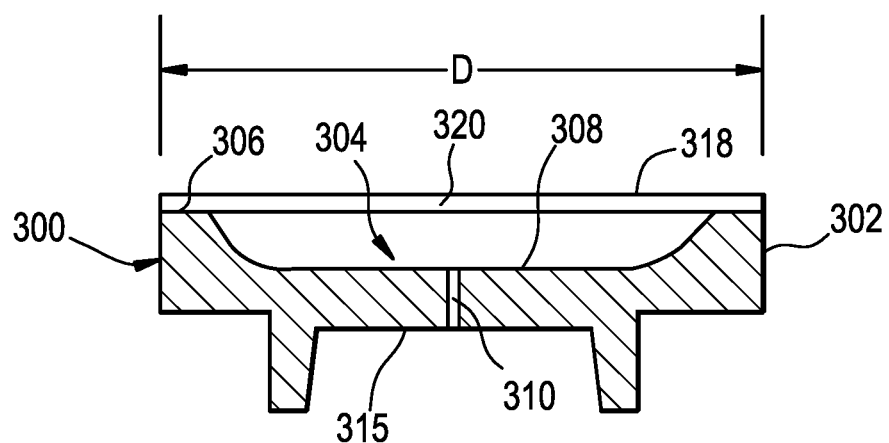
FIG. 10 is a schematic, cross-sectional diagram illustrating a representative mold for producing a 3D glass cover.

FIG. 10 is a schematic, cross-sectional diagram illustrating a representative mold suitable for use in a thermal forming process. Mold 300 includes a mold body 302 having a top surface 306 and a cavity 304. The cavity is open at the top surface 306 and its bottom comprises molding (shaping) surface 308. Molding surface 308 has a surface profile which, in accordance with the present disclosure, is corrected to compensate for coating-induced warping and/or ion-exchange-induced warping that causes a calculated, warp-induced change (i.e., a predetermined calculated, warp-induced change) to the initial shape of the part formed in the mold 300. As can be appreciated, the profile of molding surface 308 will vary from that shown in FIG. 10 depending on the specifics of the 3D glass cover that is to be made.

As shown in FIG. 10, mold body 302 can include one or more slots and/or holes 310 (hereinafter referred to as "apertures") extending from the bottom surface 315 of the mold body to the molding surface. Apertures 310 are arranged to provide communication between the exterior of the mold and the molding surface. In one example, the apertures are vacuum apertures. That is, the apertures can be connected to a vacuum pump or other device (not shown) for providing vacuum to the cavity 304 through the molding surface 308.

FIG. 10 also shows a flat glass-based substrate 318 having a portion 320 located over cavity 304. Briefly, in forming a 3D glass cover using a mold of the type shown in FIG. 10, heat is applied to plate 318 so that it sags into cavity 304, while a vacuum is applied to conform the softened glass to the shape that has been machined into molding surface 308. To withstand the temperatures associated with this process, mold 300 may be made of a heat-resistant material. As an example, the mold may be made of high temperature steel or cast iron. To extend the life of the mold, the molding surface may be coated with a high-temperature material that reduces interaction between the mold and the glass making up the glass cover, e.g., a chromium coating.

Various embodiments of the disclosure will now be described. In a first embodiment, a method of making a glass-based article is provided, the article having a coating and a target shape which comprises a planar central portion and a perimeter portion which borders at least part of the planar central portion and extends out of the plane of the planar central portion. The perimeter portion has a perimeter edge and a target edge-to-opposite edge dimension. In the first embodiment, the method comprises forming a glass-based part to provide an initial formed part having an initial three-dimensional shape that is different from the target shape for at least the target edge-to-opposite edge dimension, and applying a coating to the initial formed part to form the glass-based article having a coating, the coating imparting a stress to the initial formed part that causes a calculated, warp-induced change to the initial shape. In a second embodiment, the initial formed part of the first embodiment has a three-dimensional shape. In a third embodiment, the target shape of the second embodiment is flat.

In a fourth embodiment, the second embodiment includes forming the glass-based article comprising forming the glass-based article in a mold having a molding surface, and wherein the molding surface is designed and sized to compensate for the calculated, warp-induced change to the initial shape such that the glass-based article having the coating has the target shape and the target edge-to-opposite edge dimension. In a fifth embodiment, the target shape of the fourth embodiment is three dimensional.

In a sixth embodiment, the coating imparts a compressive stress on the formed part of any of the first through fifth embodiments. In a seventh embodiment, the coating imparts a tensile stress on the formed part of any of the first through fifth embodiments. In an eighth embodiment, the calculated, warp-induced change to the initial shape is determined by modeling in any of the first through seventh embodiments. In a ninth embodiment, the modeling of the eighth embodiment includes finite element analysis.

In a tenth embodiment, in the method of any of the first through ninth embodiments, the initial formed part includes a substrate selected from the group consisting of a laminated glass-based substrate, an ion-exchangeable glass-based substrate, a thermally strengthened glass-based substrate and a combination thereof. In an eleventh embodiment, the initial formed part of any of the first through ninth embodiments includes an ion-exchangeable glass-based substrate.

In a twelfth embodiment, the glass-based substrate of any of the first through eleventh embodiments comprises an ion exchangeable alkali aluminosilicate glass composition. In a thirteenth embodiment, the glass-based article of any of the first through eleventh embodiments comprises an ion exchangeable alkali aluminoborosilicate glass composition.

In a fourteenth embodiment, the method of embodiment eleven further comprises ion-exchange strengthening the ion-exchangeable glass-based substrate to strengthen the ion-exchangeable glass-based substrate prior to the coating. In a fifteenth embodiment, the ion exchange strengthening of the fourteenth embodiment forms a CS in a range of 100 MPa to 1100 MPa in an outer region of the ion-exchangeable glass-based substrate.

In a sixteenth embodiment, the ion exchange strengthening of the fourteenth embodiment forms a CS in a range of 600 MPa to 1100 MPa in an outer region of the ion-exchangeable glass-based substrate. In a seventeenth embodiment, the modeling of any of the fourteen through sixteenth embodiments further comprises calculating changes to the initial shape resulting from the ion exchange strengthening of the ion-exchangeable glass-based substrate.

In an eighteenth embodiment, the coating of any of the first through sixth and eighth through seventeenth embodiments imparts a compressive stress in a range of 100 MPa to 950 MPa, more specifically 400-950 MPa. In a nineteenth embodiment, the coating of any of the first through eighteenth embodiments has a thickness from 5 nanometers to 5 micrometers.

In a twentieth embodiment, the coating of any of the first through nineteenth embodiments has a thickness is in a range of 10 nanometers to 2 micrometers.

A twenty-first embodiment pertains to a method of making a glass-based article comprising forming an initial molded part using a mold having a molding surface, the initial molded part having a pre-coating three-dimensional shape which comprises a planar central portion and a perimeter portion which borders at least part of the planar central portion and extends out of the plane of the planar central portion to provide the initial molded part with three dimensionality, the perimeter portion having a perimeter edge and a pre-coating edge-to-opposite edge dimension; and coating the initial molded part with a coating to form the glass-based article, the coating imparting a stress on the initial molded part that warps the initial molded part and changes the pre-coating edge-to-opposite edge dimension of the initial molded part to provide a target edge-to-opposite edge dimension that is different from the pre-coating edge-to-opposite edge dimension, the target edge-to-opposite edge dimension being equal to a calculated value based on a modeling calculation taking into account coating thickness, coating Young's modulus and initial molded part thickness. In a twenty-second embodiment the modeling calculation of the twenty-first embodiment includes finite element analysis.

In a twenty-third embodiment, the initial molded part in any of the twenty first and twenty-second embodiments includes a substrate selected from the group consisting of a laminated glass-based substrate, an ion-exchangeable glass-based substrate, a thermally strengthened glass-based substrate and a combination thereof. In a twenty-fourth embodiment, the initial molded part in any of the twenty first and twenty-second embodiments includes an ion-exchangeable glass-based substrate. In a twenty-fifth embodiment, the twenty-fourth embodiment further comprises ion-exchange strengthening the ion-exchangeable glass-based substrate to strengthen the ion-exchangeable glass-based substrate prior to the coating. In a twenty-sixth embodiment, the ion exchange strengthening of the twenty-fifth embodiment forms a CS in a range of 100 MPa to 1100 MPa in an outer region of the ion-exchangeable glass-based substrate. In a twenty-seventh embodiment, the ion exchange strengthening in the twenty-fifth embodiment forms a CS in a range of 600 MPa to 1100 MPa in an outer region of the ion-exchangeable glass-based substrate.

In a twenty-eighth embodiment, the modeling of any of the twenty-fifth through twenty-seventh embodiments further comprises calculating changes to the target pre-coating edge-to-opposite edge dimension resulting from the ion exchange strengthening of the ion-exchangeable glass-based substrate.

In a twenty-ninth embodiment, the coating of any of the twenty-first through twenty-eighth embodiments imparts a compressive stress in a range of 100 MPa to 950 MPa. In a thirtieth embodiment, the coating of any of the twenty-first through twenty ninth embodiments has a thickness in a range of is from 5 nanometers to 5 micrometers. In a thirty-first embodiment, the coating of any of the twenty-first through thirtieth embodiments has a thickness from 10 nanometers to 2 micrometers.

A thirty-second embodiment pertains to a method of modeling dimensional changes to an initial glass-based part resulting from stress imparted by a coating on the initial glass-based part that warps the formed part. The method of the thirty-second embodiment comprises: generating, on a computer, a model that incorporates a coating thickness, a coating Young's modulus, a glass-based part thickness and a glass-based part Young's modulus; performing, on a computer, a finite element analysis using the model, wherein performing the finite element analysis comprises determining a pre-coating edge-to-opposite edge dimension of the glass-based part, and wherein the initial glass-based part has a pre-coating shape which comprises a planar central portion and a perimeter portion which borders at least part of the planar central portion and extends out of the plane of the planar central portion, the perimeter portion having a perimeter edge; and determining on a computer, based on the model, a quantitative change to the pre-coating edge-to-opposite edge dimension of the initial glass-based part resulting from the stress imparted by the coating which results in a target edge-to-opposite edge dimension.

In a thirty-third embodiment, the model of the thirty-second embodiment further comprises a calculation on a computer of changes to the pre-coating edge-to-opposite edge dimension resulting from ion exchange strengthening of the initial glass-based material molded part.

As used herein, the terms "glass-based article," "glass-based objects," "glass-based substrates," "glass-based parts," and "glass-based covers" are used in their broadest sense to include any object made wholly or partly of glass, including glass, glass-ceramics, and sapphire. "Glass-ceramics" include materials produced through controlled crystallization of glass. In embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, $ZnO×Al_2O_3×nSiO_2$ (i.e. ZAS system), and/or glass-ceramics that include a predominant crystal phase including β-quartz solid solution, β-spodumene, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur. Glass-based objects include laminates of glass and non-glass materials, laminates of glass and crystalline materials, and glass-ceramics (including an amorphous phase and a crystalline phase). Unless otherwise specified, all compositions are expressed in terms of mole percent (mol %). Glass-based substrates and parts according to one or more embodiments can be selected from soda lime glass, alkali aluminosilicate glass, alkali containing borosilicate glass and alkali aluminoborosilicate glass. In one or more embodiments, the substrate or part is a glass, and the glass can be strengthened, for example, heat strengthened, tempered glass, or chemically strengthened glass (for example, ion exchanged glass). In one or more embodiments, strengthened glass-based substrates or parts have a CS layer with a CS extending within the chemically strengthened glass from a surface of the chemically strengthened glass to a compressive stress depth of compression (DOC) of 10 μm or more, up to several tens, or even hundreds, of microns deep. In one or more embodiments, the glass-based substrate is a chemically strengthened glass-based substrate such as Corning® Gorilla® glass (available from Corning Incorporated, Corning NY).

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Thus, for example, a glass-based article that is "substantially free of MgO" is one in which MgO is not actively added or batched into the glass-based article, but may be present in very small amounts as a contaminant.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Glass-based substrates to form the initial parts and covers may be provided using a variety of different processes. For example, exemplary glass-based substrate forming methods include float glass processes and down-draw processes such as fusion draw and slot draw, updraw, and rolling processes. A glass-based substrate prepared by a float glass process may be characterized by smooth surfaces and uniform thickness, and is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further and annealed to reduce internal stress.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm, for example, 1.75 mm, 1.5 mm 1.25 mm, 1.1 mm, 1.0 mm, 0.9 mm, 0.8 mm, 0.7 mm, 0.6 mm, 0.5 mm, 0.4 mm, 0.3 mm, 0.2 mm, 0.1 mm 0.075 mm, 0.05 mm, and any ranges or sub-ranges therebetween. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region. In some embodiments, the compositions used for the glass-based substrate may be batched with 0-2 mol % of at least one fining agent selected from a group that includes $Na_2SO_4$, NaCl, NaF, NaBr, $K_2SO_4$, KCl, KF, KBr, and $SnO_2$.

Once formed, a glass-based substrate used to make the initial part may be strengthened to form a strengthened glass-based substrate to provide a strengthened substrate that is coated with a brittle coating. It should be noted that glass ceramic substrates may also be strengthened in the same manner as glass-based substrates. As used herein, the term "strengthened substrate" may refer to a glass-based substrate or a glass-based substrates that has been chemically strengthened, for example through ion-exchange of larger ions for smaller ions in the surface of the glass-based substrate. However, thermal strengthening methods known in the art, such as thermal tempering or heat strengthening, may be utilized to form strengthened glass-based substrates. In some embodiments, the substrates may be strengthened using a combination of chemical strengthening processes and thermally strengthening processes.

Examples of glasses that may be used to make substrates and parts may include alkali aluminosilicate glass compositions or alkali aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size. One example glass composition comprises $SiO_2$, $B_2O_3$ and $Na_2O$, where $(SiO_2+B_2O_3)\geq 66$ mol. %, and $Na_2O\geq 9$ mol. %. Suitable glass compositions, in some embodiments, further comprise at least one of $K_2O$, MgO, and CaO. In come embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrates or parts comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %$\leq(Li_2O+Na_2O+K_2O)\leq 20$ mol. % and 0 mol. %$\leq(MgO+CaO)\leq 10$ mol. %.

A still further example glass composition suitable for the substrates or parts comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %$\leq(Li_2O+Na_2O+K_2O)\leq 18$ mol. % and 2 mol. %$\leq(MgO+CaO)\leq 7$ mol. %.

In some embodiments, an alkali aluminosilicate glass composition suitable for the substrates or parts comprises alumina, at least one alkali metal and, in some embodiments, greater than 50 mol. % $SiO_2$, in other embodiments 58 or more mol. % $SiO_2$, and in still other embodiments 60 or more mol. % $SiO_2$, wherein the ratio $((Al_2O_3+B_2O_3)/\Sigma$ modifiers$)>1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio$((Al_2O_3+B_2O_3)/\Sigma$modifiers$)>1$.

In some embodiments, the substrates or parts may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %$\leq SiO_2+B_2O_3+CaO\leq 69$ mol. %; $Na_2O+K_2O+B_2O_3+MgO+CaO+SrO>10$ mol. %; 5 mol. %$\leq MgO+CaO+SrO\leq 8$ mol. %; $(Na_2O+B_2O_3)-Al_2O_3\leq 2$ mol. %; 2 mol. %$\leq Na_2O-Al_2O_3\leq 6$ mol. %; and 4 mol. %$\leq(Na_2O+K_2O)-Al_2O_3\leq 10$ mol. %.

In some embodiments, the substrates or parts may comprise an alkali aluminosilicate glass composition comprising: 2 mol % or more of $Al_2O_3$ and/or $ZrO_2$, or 4 mol % or more of $Al_2O_3$ and/or $ZrO_2$.

In some embodiments that include strengthened glass-based parts, such strengthened parts may be chemically strengthened by an ion exchange process. In the ion-exchange process, typically by immersion of a glass-based substrate into a molten salt bath for a predetermined period of time, ions at or near the surface(s) of the glass or glass ceramic substrate are exchanged for larger metal ions from the salt bath. In some embodiments, the temperature of the molten salt bath is about 400-430° C. and the predetermined time period is about four to about twelve hours. The incorporation of the larger ions into the glass or glass ceramic substrate strengthens the substrate by creating a compressive stress in a near surface region or in regions at and adjacent to the surface(s) of the substrate. A corresponding tensile stress is induced within a central region or regions at a distance from the surface(s) of the substrate to balance the compressive stress. Glass or glass ceramic substrates utilizing this strengthening process may be described more specifically as chemically-strengthened or ion-exchanged glass or glass ceramic substrates.

In some examples, sodium ions in a strengthened glass-based substrate are replaced by potassium ions from the molten bath, such as a potassium nitrate salt bath, though other alkali metal ions having larger atomic radii, such as rubidium or cesium, can replace smaller alkali metal ions in the glass. According to some embodiments, smaller alkali metal ions in the glass or glass ceramic can be replaced by Ag+ ions to provide an antimicrobial effect. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened substrate that results in a stress profile. The larger volume of the incoming ion produces a CS on the surface and tension (central tension, or CT) in the center of the strengthened substrate.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

In one or more embodiments, the glass-based substrate can have a surface compressive stress of 750 MPa or greater, e.g., 800 MPa or greater, 850 MPa or greater, 900 MPa or greater, 950 MPa or greater, 1000 MPa or greater, 1150 MPa or greater, or 1200 MPa.

As used herein, DOC means the depth at which the stress in the chemically strengthened alkali aluminosilicate glass article described herein changes from compressive to tensile. DOC may be measured by FSM or a scattered light polari scope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

Maximum CT values are measured using a scattered light polariscope (SCALP) technique known in the art.

Examples of glass compositions are provided above. In some embodiments, glass compositions disclosed in U.S. Pat. No. 9,156,724 ("the '724 patent") may be used to form glass-based substrates or parts. The '724 patent discloses alkali aluminosilicate glasses that are resistant to damage due to sharp impact and capable of fast ion exchange. Examples of such alkali aluminosilicate glasses comprise 4 or more mol % $P_2O_5$ and, when ion exchanged, have a Vickers crack initiation threshold of about 3 or more kgf, of about 4 or more kgf, of about 5 or more kgf, of about 6 or more kgf or of about 7 or more kgf, and any and all ranges and sub-ranges between the foregoing values. In some embodiments, the first strengthened substrate comprises an alkali aluminosilicate glass comprising about 4 or more mol % $P_2O_5$ and from 0 mol % to about 4 mol % $B_2O_3$, wherein the alkali aluminosilicate glass is $Li_2O$-free and wherein: $1.3 < [P_2O_5 + R_2O/M_2O_3] \leq 2.3$; where $M_2O_3 = Al_2O_3 + B_2O_3$, and $R_2O$ is the sum of monovalent cation oxides present in the alkali aluminosilicate glass. In some embodiments, such alkali aluminosilicate glasses comprise less than 1 mol % $K_2O$, for example 0 mol % $K_2O$. In some embodiments, such alkali aluminosilicate glasses comprise less than 1 mol % $B_2O_3$, for example 0 mol % $B_2O_3$. In some embodiments, such alkali aluminosilicate glasses are ion exchanged to a depth of layer of about 10 μm or more, and the alkali aluminosilicate glass has a compressive layer extending from a surface of the glass to the depth of layer, and wherein the compressive layer is under a compressive stress of about 300 MPa or more. In some embodiments, such alkali aluminosilicate glasses include monovalent and divalent cation oxides are selected from the group consisting of $Na_2O$, $K_2O$, $Rb_2O$, $Cs_2O$, MgO, CaO, SrO, BaO, and ZnO. In some embodiments, such alkali aluminosilicate glasses comprise from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. Glass-based substrates or parts made from the glass composition described immediately above can be ion-exchanged.

In one or more embodiments, glass compositions described in United States Patent Application Publication No. 20150239775 may be utilized to manufacture glass-based substrates that can be coated to provide the parts and covers described herein. United States Patent Application Publication No. 20150239775 describes glass-based articles having a compressive stress profile including two linear portions: the first portion extending from the surface to a relatively shallow depth and having a steep slope; and a second portion extending from the shallow depth to the depth of compression; these stress profiles can be imparted to the glass-based substrates described herein.

Examples of coatings are provided above. One example of a coating is a scratch-resistant coating. The scratch-resistant coating may exhibit a hardness of about 9 GPa or greater, as measured by a Berkovich Indenter Hardness Test. The scratch-resistant coating of some embodiments may exhibit a refractive index of about 1.7 or greater. The scratch-resistant coating may include one or more of AlN, $Si_3N_4$, $AlO_xN_y$, $SiO_xN_y$, $Al_2O_3$, $Si_xC_y$, $Si_xO_yC_z$, $ZrO_2$, $TiO_xN_y$, diamond, diamond-like carbon, and $Si_uAl_vO_xN_y$.

In one or more embodiments, the scratch-resistant coating exhibits a hardness in a range from about 9 GPa to about 30 GPa as measured by the Berkovich Indenter Hardness Test (measured from the major surface of the scratch-resistant coating). In one or more embodiments, the scratch-resistant coating exhibits a hardness in a range from about 10 GPa to about 30 GPa, from about 11 GPa to about 30 GPa, from about 12 GPa to about 30 GPa, from about 13 GPa to about 30 GPa, from about 14 GPa to about 30 GPa, from about 15 GPa to about 30 GPa, from about 9 GPa to about 28 GPa, from about 9 GPa to about 26 GPa, from about 9 GPa to about 24 GPa, from about 9 GPa to about 22 GPa, from about 9 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. In one or more embodiments, the scratch-resistant coating may exhibit a hardness that is greater than 15 GPa, greater than 20 GPa, or greater than 25 GPa. In one or more embodiments, the scratch-resistant coating exhibits a hardness in a range from about 15 GPa to about 150 GPa, from about 15 GPa to about 100 GPa, or from about 18 GPa to about 100 GPa. These hardness values may be present at indentation depths of about 50 nm or greater, or about 100 nm or greater (e.g., in a range from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

The physical thickness of the scratch-resistant coating may be in a range from about 1.5 μm to about 3 μm. In some embodiments, the physical thickness of the scratch-resistant coating may be in a range from about 1.5 μm to about 3 μm, from about 1.5 μm to about 2.8 μm, from about 1.5 μm to about 2.6 μm, from about 1.5 μm to about 2.4 μm, from about 1.5 μm to about 2.2 μm, from about 1.5 μm to about 2 μm, from about 1.6 μm to about 3 μm, from about 1.7 μm to about 3 μm, from about 1.8 μm to about 3 μm, from about 1.9 μm to about 3 μm, from about 2 μm to about 3 μm, from about 2.1 μm to about 3 μm, from about 2.2 μm to about 3 μm, from about 2.3 μm to about 3 μm, and all ranges and sub-ranges therebetween. In some embodiments, the physical thickness of the scratch-resistant coating may be in a range from about 0.1 μm to about 2 μm, or from about 0.1 μm to about 1 μm, or from 0.2 μm to about 1 μm.

In one or more embodiments, the scratch-resistant coating has a refractive index of about 1.6 or greater. In some embodiments, the refractive index of the scratch-resistant coating may be about 1.65 or greater, 1.7 or greater, 1.8 or greater, 1.9 or greater, 2 or greater, or 2.1 or greater (e.g., in a range from about 1.8 to about 2.1, or from about 1.9 to about 2.0). The scratch-resistant coating may have a refractive index that is greater than the refractive index of the glass-based substrate 210. In some embodiments, the scratch-resistant coating has a refractive index that is about 0.05 index units greater or about 0.2 index units greater than the refractive index of the substrate, when measured at a wavelength of about 550 nm.

The mathematical procedures described above can be readily implemented using a variety of computer equipment, including personal computers, workstations, mainframes, etc. Output from the procedures can be in electronic and/or hard copy form, and can be displayed in a variety of formats, including in tabular and graphical form. Software code, including data input routines for commercial software packages, can be stored and/or distributed in a variety of forms, e.g., on a hard drive, diskette, CD, flash drive, etc.

While the foregoing is directed to various embodiments, other and further embodiments of the disclosure may be devised without departing from the basic scope thereof, and the scope thereof is determined by the claims that follow.

What is claimed is:

1. A method of making a glass-based article comprising:
    forming a glass-based part comprising an initial shape that is different from a predetermined target shape for at least a target edge-to-opposite edge dimension, the initial shape comprising a planar central portion and a perimeter portion which borders at least part of the planar central portion, the perimeter portion comprising a perimeter edge;
    applying a coating to the formed glass-based part, the coating imparting a stress that causes a predetermined calculated, warp-induced change to the initial shape to form the predetermined target shape; and
    wherein the target edge-to-opposite edge dimension is equal to a predetermined calculated value based on a modeling calculation taking into account a thickness of the coating, a Young's modulus of the coating, and a thickness of the glass-based part comprising the initial shape.

2. The method of claim 1, wherein the initial shape comprises a three-dimensional shape, the three-dimensional shape comprising a planar central portion and a perimeter portion which borders at least part of the planar central portion and extends out of a plane of the planar central portion.

3. The method of claim 2, wherein the forming the glass-based article comprises forming the glass-based article in a mold comprising a molding surface, and wherein the molding surface is designed and sized to compensate for the predetermined calculated, warp-induced change to the initial shape such that the coated glass-based article comprises the predetermined target shape and the target edge-to-opposite edge dimension.

4. The method of claim 3, wherein the predetermined target shape is three-dimensional comprising a planar central portion and a perimeter portion which borders at least part of the planar central portion and extends out of a plane of the planar central portion.

5. The method of claim 1, wherein the glass-based part comprises a substrate selected from a group consisting of a laminated glass-based substrate, an ion-exchangeable glass-based substrate, a thermally strengthened glass-based substrate, and a combination thereof.

6. The method of claim 1, wherein the glass-based article comprises an ion exchangeable alkali aluminosilicate glass composition.

7. The method of claim 1, wherein the glass-based article comprises an ion exchangeable alkali aluminoborosilicate glass composition.

8. The method of claim 1, wherein the coating imparts a compressive stress in a range of from 100 MPa to 950 MPa.

9. The method of claim 1, wherein the coating has a thickness from 5 nanometers to 5 micrometers.

10. The method of claim 1, wherein prior to the forming the glass-based part determining the initial shape of the glass-based part that will produce the predetermined target shape upon applying the coating to the formed glass-based part.

11. A method of making a glass-based article comprising:
    forming a glass-based part comprising an initial shape that is different from a predetermined target shape for at least a target edge-to-opposite edge dimension, the initial shape comprising a planar central portion and a perimeter portion which borders at least part of the planar central portion, the perimeter portion comprising a perimeter edge;
    applying a coating to the formed glass-based part, the coating imparting a stress that causes a predetermined calculated, warp-induced change to the initial shape to form the predetermined target shape;
    generating a model that incorporates a thickness of the coating, a Young's modulus of the coating, a thickness of the glass-based part, and a Young's modulus of the glass-based part; and
    using the model to determine the initial shape of the glass-based part that will produce the predetermined target shape of the resulting glass-based article in response to the predetermined calculated, warp-induced change to the initial shape from applying the coating, wherein the forming the glass-based part comprises using a mold comprising a molding surface to achieve the initial shape determined by using the model.

* * * * *